United States Patent [19]

Suppan

[11] Patent Number: 4,535,884
[45] Date of Patent: Aug. 20, 1985

[54] BULK-HANDLING BELT CONVEYOR

[75] Inventor: Anton Suppan, Röthenbach, Fed. Rep. of Germany

[73] Assignee: M.A.N. Maschinenfabrik, Nuremberg, Fed. Rep. of Germany

[21] Appl. No.: 569,750

[22] Filed: Jan. 10, 1984

[30] Foreign Application Priority Data

Jan. 11, 1983 [DE] Fed. Rep. of Germany ....... 3300638

[51] Int. Cl.³ .............................................. B65G 15/14
[52] U.S. Cl. .................................... 198/626; 198/716; 198/819
[58] Field of Search ............... 198/819, 716, 659, 626, 198/643, 725; 414/139, 144

[56] References Cited

U.S. PATENT DOCUMENTS 2,232,606  2/1941  Hudson ........................... 198/716 X
3,338,383  8/1967  Hashimoto .......................... 198/819
3,578,150  5/1971  Pirovano ............................ 198/659
3,999,646  12/1976  Yoshida ......................... 198/819 X

FOREIGN PATENT DOCUMENTS 7308853  12/1974  Netherlands ....................... 198/819

Primary Examiner—Joseph E. Valenza
Assistant Examiner—Jonathan D. Holmes
Attorney, Agent, or Firm—Felfe & Lynch

[57] ABSTRACT

A bulk-handling belt conveyor has a flat belt having reinforced edges which cooperate with guides in such a way that the conveyor belt is formed at least into a trough and preferably a tube of circular cross section. A twisted, or spiral undriven, belt which is entrained within the trough or tube of the driven conveyor belt through frictional or interlocking engagement therewith. In this way, a belt conveyor is provided which is suited both for horizontal conveying and for conveying over inclined paths that are steeper than the angle of repose of the bulk material, has high handling capacity and results in little attrition of the bulk material.

8 Claims, 4 Drawing Figures

BULK-HANDLING BELT CONVEYOR

The invention relates to a bulk-handling belt conveyor, particularly far use in a vertical conveyor system for unloading ships.

Ship loading and unloading systems, for example, are known which use a single, continuously circulating flat belt with corrugated flexible skirtboards for the vertical conveying of bulk materials.

There is further known a vertical conveyor for the continuous unloading of bulk materials from ships, storerooms or the like which comprises a nonrevolving tube and, disposed therein, a conveyor screw driven in rotation by a motor. However, the handling capacity of such ascending screw-conveyor systems is relatively low. Another drawback of this prior-art vertical conveyor is the rather pronounced friction between the unloading apparatus and the bulk material, which causes wear, reduces the degree of filling, and results in undesirable attrition in the case of sensitive bulk materials such as coal, fertilizer, etc.

The object of the invention is to provide a bulk-handling belt conveyor which is suited both for horizontal conveying and for conveying over inclined paths which are steeper than the angle of repose of the bulk material, has a relatively high handling capacity, causes little attrition of the bulk material, and assures gentle handling of the material.

In accordance with the invention, this object is accomplished in that a flat conveyor belt is provided at its edges with reinforcements, more particularly steel ropes, which cooperate with guiding means such as guide rollers or the like in such a way that the flat conveyor belt is formed at least into a trough of substantially circular cross section, and, for vertical conveying particularly, preferably a tube. Disposed in the trough or tube of the conveyor belt is a spiral or twisted, undriven belt which is entrained by the driven conveyor belt through frictional or interlocking engagement therewith.

The relative speed between the conveyor belt and the twisted belt is nearly zero. The conveyor belt alone is driven.

An embodiment of the invention is shown diagrammatically in the drawing, wherein.

The belt conveyor of the figures, which can be used for horizontal conveying, inclined conveying, and steep or vertical conveying of bulk materials, comprises a single, continuously circulating, endless, flat conveyor belt 1 and an endless, spiral, preferably multiply flexible belt 2, not power-driven, which is disposed, loose or fastened, along the flat conveyor belt to be in the hollow space of the conveyor belt when it is closed, tube-like, on itself. The conveyor belt 1 is carried and circulated by a frame and power structure which is not shown.

Figure 1:
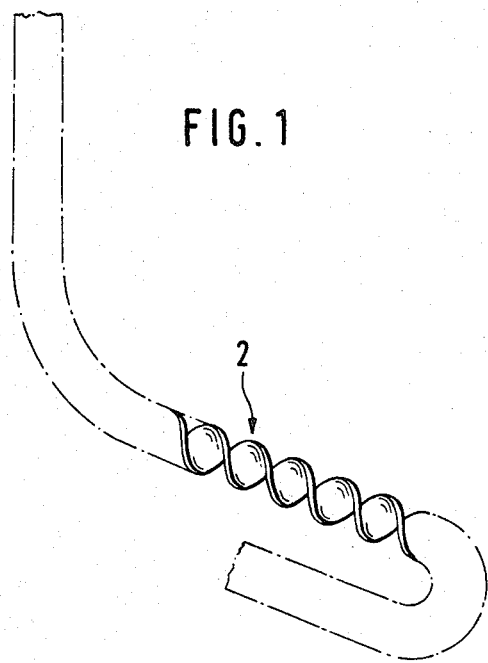
FIG. 1 is a fragmentary view of one part of the embodiment, namely, a spiral or twisted belt.
Figure 3:
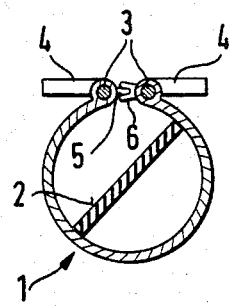
FIG. 3 is a cross-sectional view through one run of the embodiment at the plane III—III in FIG. 2.

The conveyor belt 1 is a flat belt with both edges reinforced with embedded steel ropes 3. Along one of the reinforced edges is a row of spaced knifelike blades or tongues 5 (only one shown) which penetrate into matching recesses at grooves 6 (only one shown) on the other reinforced edge at least along a material-conveying run 8 of the belt conveyor between, but not including, a bulk-material pickup point 7 and a bulk-material discharge point 7a. For this, the conveyor belt 1 is closed on itself along the reinforced edges appropriately-disposed guide rollers 4 on the frame (not shown) which engage the conveyor belt along a bead formed by the edge reinforcements as shown in FIG. 3. In order to urge the conveyor belt to close on itself with the tongues and grooves inter-penetrating, in a sense "zipping" the flat conveyor belt into a tube of generally circular cross-section about the spiral belt 2 and the bulk material being conveyed, the rollers 4 may have specially-configured, frictional or urging edges for applying appropriate closing forces, like the inclined or upper-lip edge shown in FIG. 3.

Figure 4:
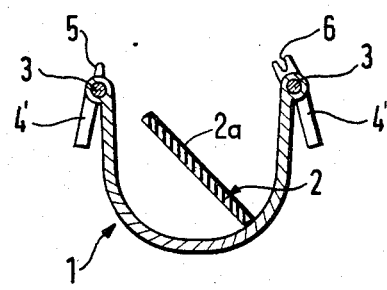
FIG. 4 is a cross-sectional view through one run of the embodiment at the plane IV—IV in FIG. 2.
Figure 2:
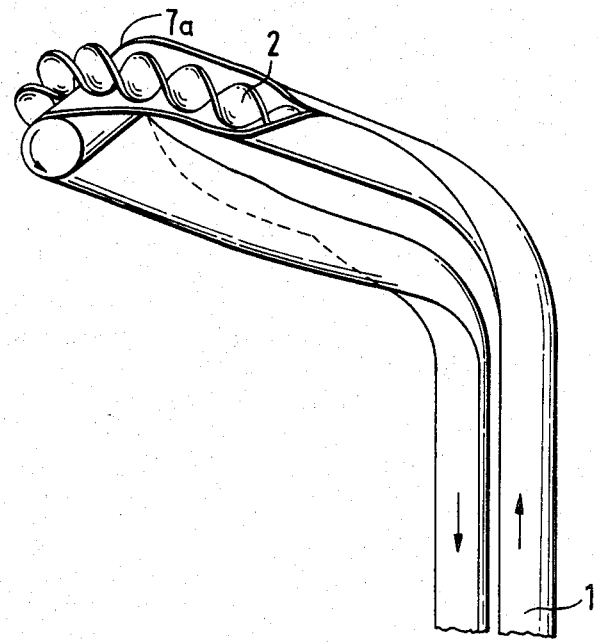
FIG. 2 is a perspective view of the embodiment.
Figure 2:
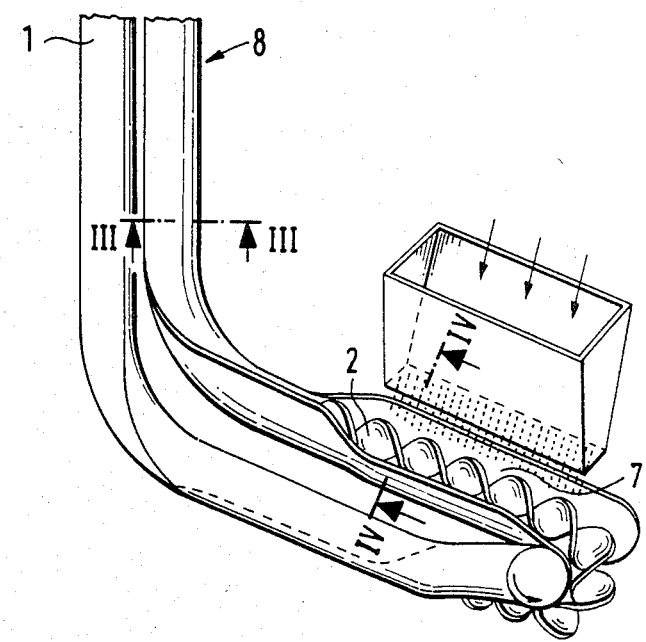

Also, of course, successive rollers along the conveyor belt 1 are positioned appropriately on the frame, for example progressively closer to the belt-closing orientation shown in FIG. 3 from the open or trough-belt orientation shown for rollers 4' in FIG. 4 at the bulk-material pickup point 7.

The inclination of the "screwlike" or spiral belt 2 is determined by the angle of repose of the bulk material to be conveyed, that is to say, the inclination should be less steep than the angle of repose of the bulk material. The inclination of the spiral belt 2 means the inclination of the spirally-inclined belt surfaces relative to the axis of the spiral.

The twisted or spiral belt 2 is disposed along the conveyor belt 1 so that it is entrained through frictional engagement with the inner wall of the conveyor belt 1 when closed, tube-like. In this way, the bulk material is conveyed without abrading relative motion between the belts 1 and 2.

The preferred field of application is the conveying of bulk materials over inclined paths which are steeper than the angle of repose of the bulk material. The belt conveyor may be used both in unloading and in loading systems.

When the belt conveyor of the invention is used as a vertical conveyor in ship unloading systems, for example, it is disposed, supported and guided on the supporting structure or frame (not shown) conventionally. The conveyor belt 1 is disposed and guided so that in proximity to the bulk-material pickup point 7, it extends horizontally or approximately horizontally.

In steep or vertical conveying, the tube or hose of belt 1 accommodating the spiral belt 2 is closed outside the bulk-material pickup and discharge points. The flat belt 1 thus has has a circular cross section.

In horizontal conveying, conveyor belt 1 may be open at the top or only substantially closed, as a trough, as at the bulk-material pickup point 7 shown in FIG. 4.

I claim:
1. A bulk-handling belt for a conveyor, comprising:
   a flat conveyor belt having reinforced edges cooperative with guiding means of the conveyor for at least substantially closing the conveyor belt on itself along the reinforced edges into at least a trough of generally-circular cross section at least along a material-conveying run of the conveyor belt; and
   a twisted, or spiral belt disposed along the flat conveyor belt and arranged to be substantially enclosed and entrained by the flat conveyor belt when said flat conveyor belt is substantially closed thereabout.

2. The belt conveyor according to claim 1 wherein the reinforced edges are closed to form the conveyor belt trough into a tube and one of the reinforced edges further comprises blades spaced therealong and the other reinforced edge further comprises matching recesses to receive the blades when the conveyor belt is so closed.

3. The belt conveyor according to claim 1, wherein the reinforced edges of the conveyor belt comprise means for forming a bead and the guiding means comprises rollers cooperative therewith.

4. The belt conveyor according to claim 1, wherein the means for forming a bead comprise steel ropes embedded in the flat conveyor belt.

5. The belt conveyor according to claim 1, wherein the twisted or spiral belt is multiply.

6. The belt conveyor of claim 1, wherein the flat conveyor belt and the twisted or spiral belt are endless.

7. In a belt conveyor having frame means for disposing and driving the belt conveyor between bulk-material pickup and discharge points, the improvement comprising:

an endless, flat conveyor belt having reinforced edges;

guide means on the frame cooperative with the reinforced edges for substantially closing the conveyor belt on itself along the reinforced edges into a tube of generally circular cross-section at least along a run of the conveyor belt from the bulk-material pickup point to the discharge point, whereby the belt conveyor is adapted for steeply conveying the bulk-material, and less-substantially closing the same into no more than a trough of generally circular section at the bulk-material pickup and discharge points for bulk-material pickup and discharge; and an endless twisted or spiral belt disposed along the flat conveyor belt for being in the trough thereof and enclosed by the tube thereof and entrained thereby.

8. The belt conveyor according to claim 7, and further comprising matching blades or tongues and recesses or grooves spaced along the respective, opposite reinforced edges of the conveyor belt for interpenetration when the conveyor belt is closed on itself.

* * * * *